Oct. 31, 1950

A. F. BAUER 2,528,329

APPARATUS FOR REMOVING POWER UNITS FROM AUTOMOTIVE VEHICLES

Filed Aug. 16, 1946

INVENTOR.
ALBERT F. BAUER
BY
A. D. T. Libby
Attorney

Oct. 31, 1950 A. F. BAUER 2,528,329
APPARATUS FOR REMOVING POWER UNITS
FROM AUTOMOTIVE VEHICLES
Filed Aug. 16, 1946 2 Sheets-Sheet 2
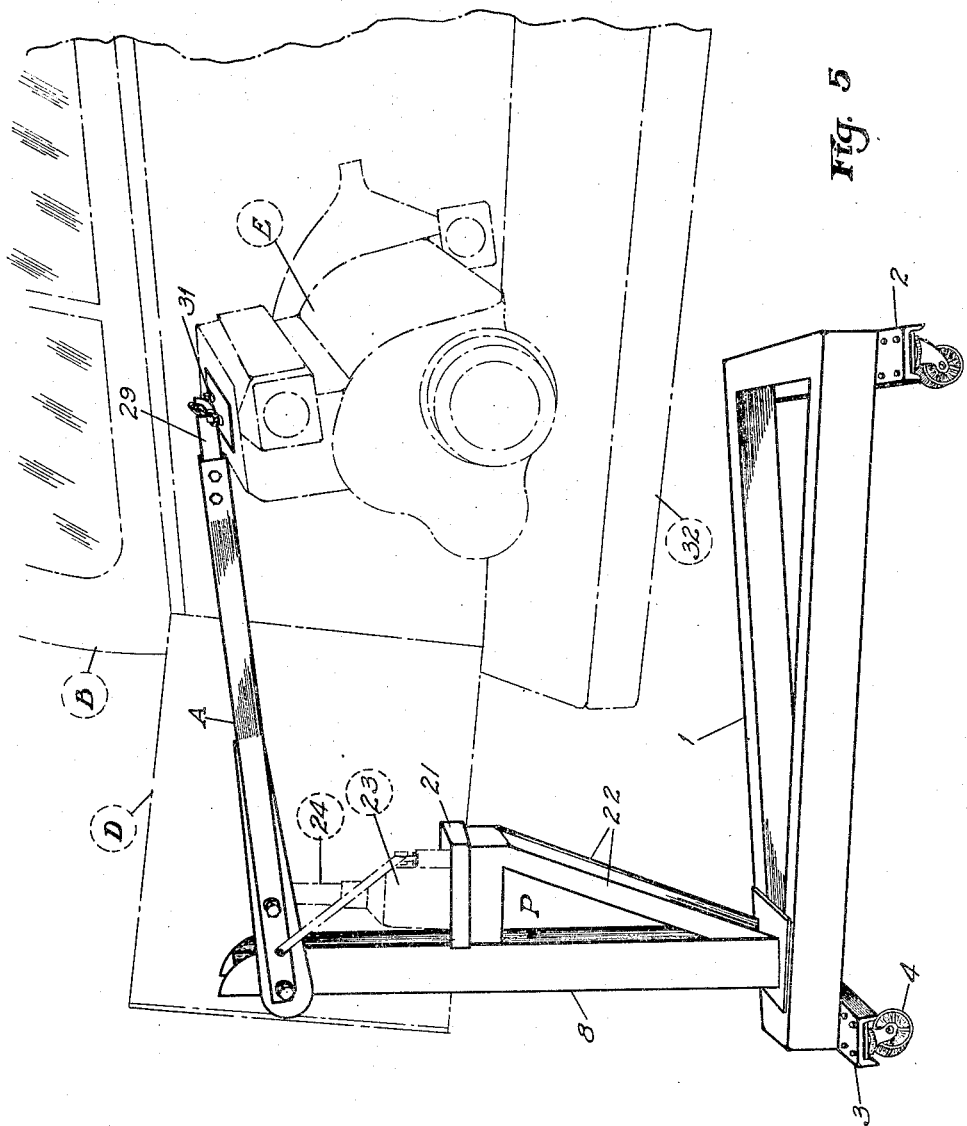
INVENTOR.
ALBERT F. BAUER
BY Patented Oct. 31, 1950

2,528,329

UNITED STATES PATENT OFFICE 2,528,329

APPARATUS FOR REMOVING POWER UNITS FROM AUTOMOTIVE VEHICLES

Albert F. Bauer, Union, N. J.

Application August 16, 1946, Serial No. 691,133

4 Claims. (Cl. 254—124)

This invention relates to an apparatus for removing power units from an automotive vehicle especially such units as used in buses.

In many of the larger types of buses power plants are mounted in the rear end of the chassis in such a manner that they are extremely hard to get at for doing service work thereon. It very frequently happens that the entire power unit including the engine and transmission has to be removed and I have found from experience that it is a very difficult job to get them out of the chassis for many reasons, one of which is that in a great many buses the rear cross bar of the chassis is not removable and is positioned above the base of the power unit making it extra difficult to get the power unit out of the chassis.

After trying various ways and means to remove said power units, I finally evolved the structure shown in the accompanying drawings and described in the following specification, which structure contains the principal object of my invention which is to provide an apparatus that is easy to manufacture and handle but which will do the work of lifting the engine out of the buses in a relatively short space of time as compared with the length of time and labor heretofore required. In the drawings, Figure 1 is a perspective view of the complete assembled apparatus ready for use.

Figure 5 is a perspective view of the apparatus showing how it is utilized in withdrawing the engine from the rear end of the bus.

Figure 2:
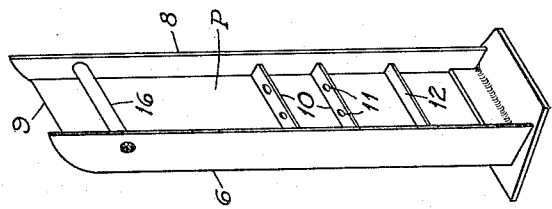
Figure 2 is a perspective view of one of the elements referred to as a post or standard shown in Figure 1.
Figure 3:
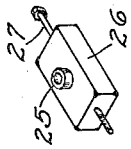
Figure 3 is a perspective view of one of the parts forming an element of the arm shown in Figure 1.
Figure 1:
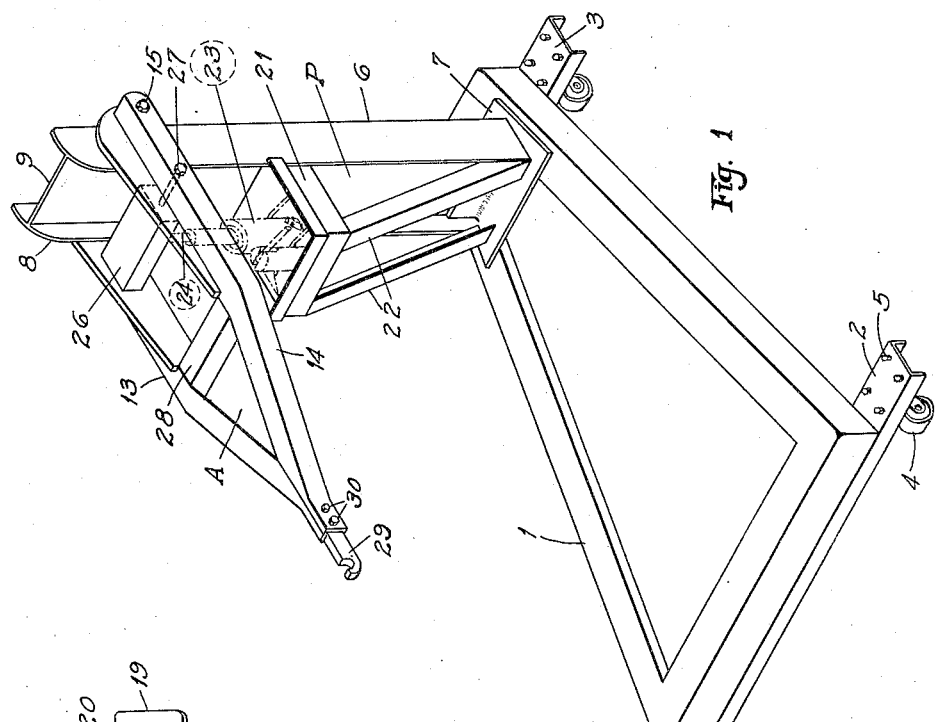
Figure 4:
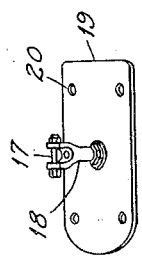
Figure 4 is a perspective view of a removing plate used in cooperation with the arm shown in Figure 1.

In the various views wherein like numbers refer to corresponding parts, I is a base, preferably made of strong structural steel such as angle iron welded together, carried on cross bars 2 and 3 that are supplied with casters 4 which are fastened to their respective bars 2 and 3 in a satisfactory manner as by screw stud 5. It will be noted from Figure 1 that the base I tapers from the cross bar 2 toward the bar 3. At this narrow end of the base I is mounted a post or standard P having a support plate 7 to which it is welded and the plate 7 is welded to the base I. I prefer to make the post P out of a piece of iron having the shape of an I beam as shown in Figure 1 although a pair of channel irons having their webs welded together, making the equivalent of an I beam, may be used, if a regular I beam is not available. The sides of post P, 6 and 8, are held together by the usual web 9. On the rear side of the post are fastened as by welding one or more cross members 10 having holes 11 therein in alignment for the reception of certain operating tools, the ends of which rest on a supplemental cross member 12. Pivotally mounted on the top of the post P is a long arm A having spaced side members 13 and 14 that are pivoted on a rod 15 that preferably is supported throughout its length in a tube 16 fastened to the side members 6 and 8 of the post P. The members 13 and 14 of the arm A extend away from the post P over the base I and merge together and are fastened at their extremities in any satisfactory manner as by bolts 30 which bolts pass through a hook 29 which is adapted to engage a member that is attached to the power unit for example, such as the bolt 17 carried by the member 18 that is fastened to the plate 19 having holes 20 therein. Plate 19 is adapted to be fastened to a transmission after removing certain screw studs from it to allow the plate 19 to be fastened thereto. Likewise a plate having holes therein to correspond to the location of the screw studs in the head of the engine, is utilized after the head has been removed so the hook 29 will engage a member 31 on the engine head similar to the bolt 17.

Intermediate the ends of the post P a shelf 21 is fastened and is also held by braces 22 that are welded to the plate 7 as well as to the shelf 21. This shelf 21 is adapted to receive a power applying device such as a hydraulic jack 23. Since this jack per se is no part of my invention but being a piece of apparatus that is utilized with my structure, it is merely indicated in dotted lines in Figure 1. However, the plunger end 24 of the jack 23 is adapted to enter a socket 25 in a strong rigid member 26 that is preferably carried by screw bolt 27 passing through the arms 13 and 14 so that the member 26 may turn so it remains in a plane at right angles to the axis of the jack plunger, as the arm A is raised and lowered by the jack 23. The hook member 29 may be provided along its length with extra holes so that it may be longitudinally adjusted in the members 13 and 14 which are preferably made of channel iron, or they can be made of angle iron, with one arm of each angle extending over the top of the bar 29. Preferably the arms 13 and 14 are braced by the brace member 28 located between the members 13 and 14 near the place where they begin to converge toward the hook-union.

In Figure 5 the apparatus is shown in the act of withdrawing the engine E from the rear end of the bus B. One of the doors D is shown in open position. The rear frame member of the bus chassis is indicated by the number 32. Since the bus and engine per se form no part of my invention, they are shown in broken lines. Having thus described my invention, what I claim is:

1. An apparatus for removing a power unit from the chassis portion of an automotive vehicle comprising a base made up of structural metal such as steel and mounted on casters so one end of the base may be easily rolled under the chassis where the unit to be removed is located, this end being of substantial width and much wider than the opposite end, a post of stiff structural metal having a width approximating the width of the narrow end of the base and fastened to this end and extending upwardly therefrom, an arm having two stiff members spaced at one end with these spaced ends pivoted to opposite sides of said post, the members extending away from the post over the length of the base and having their extended ends brought and fastened together with means fastened at this union for making an attachment to said vehicle power unit, a cross bar rotatably carried between said arm members and adapted to be engaged by a part of a power applying device such as a hydraulic jack and a shelf extending at right angles away from the post but having its sides nearest the post fastened to the post and having supports extending from the base to that part of the shelf farthest from the post, said shelf serving for carrying said power applying device.

2. An apparatus as set forth in claim 1 further defined in that the post includes as part of the structure at least one channel iron having the channel facing outwardly toward the narrow end of the base and having spaced cross members fastened within the channel, the cross members having holes in substantial vertical alignment to receive operating tools.

3. An apparatus as set forth in claim 1 further defined in that the base includes a rigid transverse supporting member at each end thereof, the ends of said transverse members preferably extending beyond the side members of the base and having said castors fastened to these extending ends.

4. An apparatus for removing a power unit from the chassis portion of an automotive vehicle comprising a base adapted to have one end inserted under the chassis where the unit to be removed is located, this end being much wider than the opposite end, a post fastened to said opposite and narrow base end and extending upwardly therefrom, an arm pivotally mounted on the upper end of the post, said arm including two members pivoted at their ends one on each side of the post near its top, said members extending over the base and converging to a union and a hook-bar fastened to said members at the union, a brace between said members located near the points of convergence, a shelf fastened in position on the post below the arm far enough to operatively receive a power applying tool, a bar rotatably positioned between the arm members and having means for receiving a part of said tool.

ALBERT F. BAUER.

REFERENCES CITED

The following references are of record in the file of this patent:

UNITED STATES PATENTS

| Number | Name | Date |
|---|---|---|
| 1,887,965 | Stoner | Nov. 15, 1932 |
| 2,113,879 | Delalandre | Apr. 12, 1938 |
| 2,208,221 | McCullough | July 16, 1940 |
| 2,389,872 | Ruger et al. | Nov. 27, 1945 |